United States Patent [19]
Canavan et al.

[11] 3,772,451
[45] Nov. 13, 1973

[54] AERIAL CABLE GUARD

[75] Inventors: John Andrew Canavan, Agincourt; William Robert Stewart, West Hill, both of Ontario, Canada

[73] Assignee: Bell Canada, Montreal, Quebec, Canada

[22] Filed: Jan. 26, 1973

[21] Appl. No.: 326,892

[52] U.S. Cl.................... 174/41, 174/5 R, 174/136
[51] Int. Cl. ......................... H02g 7/00, H02g 7/10
[58] Field of Search.................... 174/5 R, 40 R, 41, 174/70 A, 135, 136, 139; 191/30; 248/61

[56] References Cited
UNITED STATES PATENTS

| 367,475 | 8/1887 | VanDepoele | 174/40 R X |
| 425,107 | 4/1890 | Penney | 191/35 |
| 989,212 | 4/1911 | VanNostran | 174/41 |
| 1,183,709 | 5/1916 | Zanella | 191/35 |
| 1,967,134 | 7/1934 | Short | 174/41 |
| 2,451,004 | 10/1948 | VanAntwerp | 174/41 |
| 2,812,380 | 11/1957 | Lehrke | 174/41 |

FOREIGN PATENTS OR APPLICATIONS

| 715,523 | 9/1931 | France | 174/5 R |
| 212,514 | 7/1909 | Germany | 174/139 |
| 221,150 | 9/1924 | Great Britain | 174/5 R |
| 181,314 | 11/1962 | Sweden | 174/40 R |
| 124,847 | 3/1928 | Switzerland | 174/5 R |

*Primary Examiner*—Laramie E. Askin
*Attorney*—John E. Mowle

[57] ABSTRACT

A plastic chevron-shaped guard is affixed to the supporting messenger strand of an aerial cable. The chevron protects the cable from damage due to mastication by squirrels and the like and yet permits inspection and access to it.

2 Claims, 2 Drawing Figures

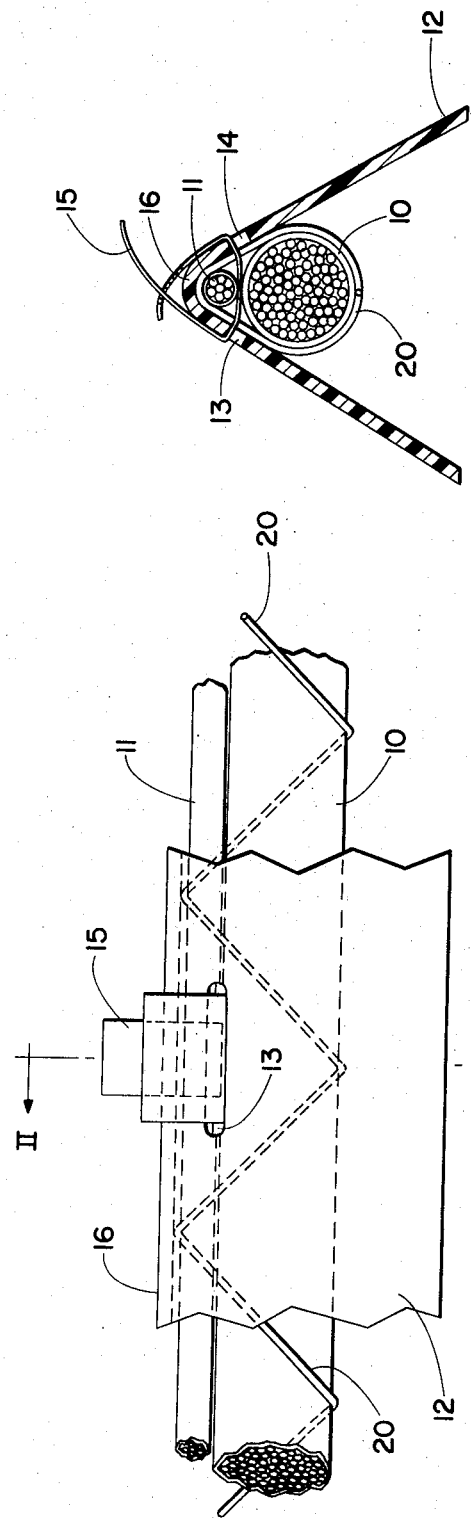

AERIAL CABLE GUARD

This invention relates to an aerial cable guard and more particularly to one which may be used to protect a multi-pair communications cable from damage caused by squirrels and the like and yet provides ready inspection and access to the cable itself.

BACKGROUND OF THE INVENTION

In modern telephone communications, extensive use is made of multi-pair cables having an exterior lead or plastic sheath. This sheath is very susceptible to damage caused by squirrels which bite into the exterior sheath. In some instances, the conductors themselves are damaged while in others, the opening of the exterior sheath allows the entrance of moisture which deteriorates the electrical parameters of the cable.

In the past, cable guards have been used which completely encircled the cable and utilized various locking methods. While preventing damage caused by squirrels, these guards severely restricted access to the communications cable. This resulted in great difficulty in locating leaks and various other faults in the cable. In addition, this combination was not very suitable for splicing drops such as required for telephone or cable-television installations. Such a cable guard was usually suited for lashed cable only, i.e., where the supporting messenger strand was helically bound to the communications cable by a lashing wire, as opposed to the type where the cable is hung from the strand by a series of rings. In addition, the encircling guard was often difficult to install and hard to remove.

SUMMARY OF THE INVENTION

The disadvantages of existing cable guards have been overcome by providing a plastic chevron-shaped guard which is placed over the cable combination and affixed thereto.

Thus, in accordance with the present invention there is provided a combination of a multi-conductor electrical communications cable and a supporting messenger strand which runs along the length of the communications cable. In addition, an upwardly directed plastic chevron is longitudinally disposed over the cable with its interior apex in contact with at least portions of the supporting cable. Means are also provided for affixing the chevron to the supporting cable so that the communications cable is exposed on the underside of the chevron yet protected from damage by squirrels and the like. Should the squirrels bite into the chevron guard, they can do so without causing any damage to the communications cable itself. Thus, this arrangement still enables them to live in the immediate area. Such a structure is feasible because of the realization that the diameter of the cable is at least several times that of the messenger strand. Since the chevron guard is affixed only to the strand rather than the overall aerial cable assembly, it is restrained from rotating around the assembly in strong winds. This negates the possibility of the chevron collecting rain, snow or ice and consequently placing a severe structural stress on the cable assembly.

BRIEF DESCRIPTION OF THE DRAWINGS

An example embodiment of the invention will now be described with reference to the accompanying drawings in which:

FIG. 1 is a side elevational view of a section of an aerial cable system employing a cable guard in accordance with the present invention; and FIG. 2 is a cross-sectional view of the aerial cable taken along the line II—II of FIG. 1.

DESCRIPTION OF THE PREFERRED EMBODIMENT

Referring to FIGS. 1 and 2, the aerial cable comprises a conventional multi-paired telephone cable 10 which is lashed to a messenger strand 11 by a helical lashing wire 20. In a typical installation, the strand 11 supports the cable 10 and is affixed at intervals to telephone poles (not shown).

Over the cable 10 and the strand 11 is an upwardly directed plastic chevron 12 which is disposed along the length of the cable 10 and the strand 11. At periodic intervals, there are pairs of holes 13 and 14 in the plastic chevron 12. A conventional plastic clip 15 is inserted through the holes 13 and 14 between the cable 10 and the strand 11 and thence back around the exterior apex 16 of the chevron 12. The ends of the clip 15 are coupled together in any one of a number of well known ways.

As shown in the drawings, the bottom of the chevron 12 is open thereby permitting inspection and access to the multi-paired cable 10 without removal of the chevron 12. Because the diameter of the cable 10 is several times that of the strand 11, the chevron 12 is effectively prevented from rotating around and under the cable 10 and thence acting as an eavestrough which could result in severe structural stress on the cable assembly caused by rain, snow and ice loading. Because the chevron 12 is made of plastic, it will readily spread thereby permitting the use of cable with a diameter approaching that of the length of the legs of the chevron 12.

The plastic guard 12 may also be used on aerial cable where the cable 10 is suspended by a plurality of rings from the strand 11 at periodic intervals. In installations of this nature, the cable 10 may protrude below the bottom of the chevron 12 but still retains the guard feature. With both installations, squirrels and other such animals may scamper along the top of the chevron 12. If they do chew into the chevron 12, they will eventually strike the messenger strand 11 with no resultant damage to the communications cable 10.

In a typical installation, the guard 12 is made of rigid polyvinylchloride having a wall thickness of 0.06 inches. The guard 12 is supplied in lengths of up to 10 feet and can be readily cut in the field for installation.

What is claimed is:

1. In an aerial cable system, the combination comprising:
    a multi-conductor electrical communications cable having an exterior sheath; and
    a supporting messenger strand for at least periodically supporting said communications cable along its length between spans;
    the improvement comprising:
    an upwardly directed plastic chevron, longitudinally disposed over said cable and said strand, having its interior apex in contact with at least portions of said messenger strand; and
    means affixing said chevron to said messenger strand; whereby said communications cable is exposed on the underside of the chevron yet protected from damage by squirrels and the like which run therealong.

2. The combination as defined in claim 1 in which said chevron has pairs of periodically spaced holes along its length, one on each leg of the chevron substantially adjacent said apex; and in which each of the means affixing the chevron comprises an annular clamp which passes through said pair of holes, under said supporting cable and over the exterior apex of the chevron.

* * * * *